(12) United States Patent
Larsson (10) Patent No.: US 7,697,409 B2
(45) Date of Patent: Apr. 13, 2010

(54) TRANSMITTER APPARATUS AND METHOD FOR TRANSMITTING PACKET DATA UNITS IN A COMMUNICATION SYSTEM

(75) Inventor: Peter Larsson, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 272 days.

(21) Appl. No.: 11/722,245

(22) PCT Filed: Dec. 21, 2004

(86) PCT No.: PCT/SE2004/001946

§ 371 (c)(1),
(2), (4) Date: Jun. 20, 2007

(87) PCT Pub. No.: WO2006/068543

PCT Pub. Date: Jun. 29, 2006

(65) Prior Publication Data

US 2008/0165671 A1    Jul. 10, 2008

(51) Int. Cl.
*H04J 9/00* (2006.01)
(52) U.S. Cl. .................... 370/204; 370/203; 370/479; 370/480; 370/235; 370/210; 375/296; 375/261; 375/346; 375/222; 375/341; 375/348; 375/228; 375/227; 375/262; 375/260; 455/296; 455/103; 455/126
(58) Field of Classification Search .................. None
See application file for complete search history.

(56) References Cited

U.S. PATENT DOCUMENTS 6,175,550 B1 *   1/2001   van Nee .................. 370/206

(Continued)

FOREIGN PATENT DOCUMENTS

CA    WO 2004/054193 A2 *   6/2004

(Continued)

OTHER PUBLICATIONS

U.S. Appl. No. 60/014,648, filed Jun. 1999, Gibbons.*

(Continued)

*Primary Examiner*—Chi H Pham
*Assistant Examiner*—Kouroush Mohebbi
(74) *Attorney, Agent, or Firm*—Coats & Bennett, P.L.L.C.

(57) ABSTRACT

In a communication system, when packet data units (PDUs) to be transmitted from a transmitter apparatus are modulated according to Orthogonal Frequency Division Multiplexing (OFDM), the waveforms representing the modulated PDUs will experience different peak to average ratio values (PAR) making the PDUs differently sensitive to non-ideal transmitter characteristics. To minimize errors in the transmitted PDUs, at least two PDUs (304, 305, 306) are scrambled and modulated in parallel and substantially simultaneously in the transmitter (100), and the PAR values of the at least two PDUs (304, 305, 306) are determined at each transmit instance. The measured PAR values of the at least two PDUs are compared in a scheduler (310), and the scheduler selects for transmission the PDU with the lowest PAR value. The scheduler (310) then instructs the transmitter (100) to transmit the selected PDU. If the PDUs that were not selected for transmission are re-scrambled and re-modulated before they are transmitted, the average PAR value for a transmitted PDU can be lowered by 2-3 dB with the invention if 8 PDUs are compared at each transmit instance.

38 Claims, 5 Drawing Sheets

U.S. PATENT DOCUMENTS

| | | | |
|---|---|---|---|
| 6,373,859 B1 * | 4/2002 | Jedwab et al. | 370/479 |
| 6,785,258 B1 * | 8/2004 | Garcia et al. | 370/344 |
| 2004/0093545 A1 * | 5/2004 | Khandani et al. | 714/746 |
| 2004/0128533 A1 * | 7/2004 | Choi et al. | 713/200 |

FOREIGN PATENT DOCUMENTS

| | | |
|---|---|---|
| EP | 1381196 | 1/2004 |
| WO | 00/79747 | 12/2000 |
| WO | 2004/054193 | 6/2004 |
| WO | WO 2004054193 A2 * | 6/2004 |

OTHER PUBLICATIONS

Muller, S. et al. "A Comparison of Peak Power Reduction Schemes for OFDM." IEEE Global Telecommunications Conference, 1997. vol. 2, Nov. 3-8, 1997, pp. 1-5.

* cited by examiner

TRANSMITTER APPARATUS AND METHOD FOR TRANSMITTING PACKET DATA UNITS IN A COMMUNICATION SYSTEM

FIELD OF THE INVENTION

The present invention relates to a transmitter apparatus in a communication system and to a method in a transmitter apparatus for transmitting packet data units. More particularly, the present invention relates to a method and a transmitter apparatus for efficiently transmitting packet data units modulated using a modulation method such as a multicarrier modulation method using Orthogonal Frequency Division Multiplex (OFDM).

BACKGROUND OF THE INVENTION

It is desired for wired and wireless communication systems to be as efficient as possible to maximise the numbers of users that can be served and the data rates used by the users in the system. Also, the systems should be robust such that data can be transmitted also in bad conditions, such as bad radio conditions for a wireless communication system.

Orthogonal Frequency Division Multiplexing (OFDM) is an example of a modulation scheme or method that can be used in a communication system for efficiently and robustly transmitting data over a channel. The basic principle of OFDM and similar modulation schemes is to split a high rate data stream into a number of lower rate data streams that are transmitted simultaneously over a number of subcarrier frequencies, i.e. subchannels. In this way, the signals, i.e. waveforms, of the lower rate data streams are superimposed into an OFDM signal that is transmitted. To obtain a high spectral efficiency the frequency response of the subchannels are overlapping and orthogonal, hence the name OFDM. By introducing a cyclic prefix as a "guard time" between each packet data unit (in OFDM called OFDM symbol) of the OFDM signal this orthogonality can be maintained even though the signal passes through a time dispersive channel. The cyclic prefix is a copy of the last part of the OFDM symbol and it is inserted before the symbol. This makes the transmitted flow of OFDM symbols periodic, and it plays a decisive role in avoiding intersymbol and intercarrier interference. OFDM is described in e.g. "An introduction to orthogonal frequency-division multiplexing" by Edfors et al, Research Report TULEA 1996:16, Div. of Signal Processing, Luleå University of Technology, Luleå, September 1996. OFDM is also described in "OFDM for Wireless Multimedia Communications" by Prasad et al, Artech House, 2000, ISBN 0-89006-530-6. OFDM is a modulation scheme used in Digital Audio Broadcasting (DAB), Digital Video Broadcasting (DVB), the Wireless Local Area Network (WLAN) standards Hiperlan2 and IEEE 802.11a, the Wireless Metropolitan Area Network (WMAN) standard IEEE 802.16 and ADSL (Asymmetrical Digital Subscribes Lines). It is also an envisioned modulation scheme for a future $4^{th}$ Generation radio interface for mobile communication.

One of the drawbacks with OFDM is that, for an OFDM signal that forms an OFDM symbol, the ratio between the peak power and the average power (peak to average ratio, PAR) may be large. This may occur since the waveforms of the subchannel data streams are superimposed into an OFDM signal, and, the waveforms may in a certain moment add up to a momentarily high peak value. This large peak to average ratio reduces the efficiency of the power amplifier in the transmitter because the power amplifier has to be designed with large back off. If not, there will be distortions on the signal for occasions with high signal power. I.e. there is a trade off between distortion and power efficiency. The higher PAR value, the more sensitive the OFDM symbol will be to non-ideal characteristics of the transmitter, for example in the power amplifier. Other multicarrier modulation schemes experiencing similar problems may be e.g. Orthogonal Code Division Multiplex (OCDM) or Multi Carrier Code Division Multiple Access (MC-CDMA). As shown, there exists a need for a system which, when used for transmission of packet data units represented by waveforms, minimizes distortion due to high sensitivity of the packet data units to non-ideal transmitter characteristics. More particularly, there exists a need for a system which, when a multicarrier modulation scheme is used for transmission of packet data units, maximizes power efficiency while at the same time minimizing distortion due to high sensitivity of the packet data units to non-ideal transmitter characteristics, such as high PAR values.

This need may be taken care of by designing efficient linearization techniques for power amplifiers such that the power amplifiers may amplify higher signal powers without distortion, such as Dorothy amplifiers, LANC (Linear Amplification with Non-linear Components) and feed forward compensation mechanisms. However, such amplifier improvements result in expensive amplifiers, consuming comparatively much power.

Several other procedures for avoiding the problems due to non-ideal transmitter characteristics, and especially due to high PAR values has been studied, as described in "OFDM for Wireless Multimedia Communications" by Prasad et al. A common aspect for many of those procedures is that they primarily strive to solve the problems due to high PAR values in the modulation and/or error correction coding process. However, other procedures based on various forms of clipping of the peaks have also been described. Although, by clipping the peaks, the signal to noise ratio is lowered. Other procedures, as described in e.g. U.S. Pat. No. 6,175,551 and U.S. Pat. No. 6,751,267, are based on peak cancellation through subtraction of an appropriate reference function or replacement symbol. A drawback of these procedures is that extra overhead is created, i.e. they are power inefficient. Moreover, in one embodiment of U.S. Pat. No. 6,751,267, intentional errors are introduced to reduce the PAR, at the expense of reduced error correction performance.

A typical feature in communication is to use scrambling of data at transmission and descrambling of the data at reception. The objective is to randomize the data stream for spectrum shaping purposes, but also to minimize the possibility of transmission of an unmodulated carrier and to ensure adequate numbers of bit transitions to support clock recovery. In e.g. Hiperlan 2, as described in "Broadband Radio Access Networks (BRAN); HIPERLAN Type 2; Physical (PHY) layer", ETSI TS 101 475 V1.2.2 (2001-02), the physical layer receives packets from above layer (that among other things handle retransmissions) and scramble the data prior coding and modulation. The scrambling generator uses a seed that changes from MAC frame to frame. The result of the above is that, although circumstantial, Hiperlan2 uses a technique wherein if a packet was not correctly received by the receiver, and the receiver has sent a Negative Acknowledge message to the transmitter, the transmitter will re-scramble the packet before it is retransmitted. As a result, a differently coded packet with probably less sensitivity to non-ideal transmitter characteristics, by having a lower PAR for example, will be achieved, if the reason for the packet not reaching the receiver in the first place was that it e.g. had a high PAR. In this technique, power and transmission resources are unnecessarily used for transmitting packets that subsequently need to be retransmitted.

Despite much research effort in this area over the years, a fully satisfactory solution for maximizing power efficiency while minimizing errors in transmitted packet data units due to high packet data unit sensitivity to non-ideal characteristics of the transmitter, such as high PAR values, with a reasonable complexity has not yet been found.

SUMMARY OF THE INVENTION

The object of the invention is to improve transmission performance in a communication system when transmitting packet data units from a transmitter to at least one receiver by g errors in the transmitted packet data units.

The solution according to the present invention achieves the above mentioned object by determining a value of a sensitivity to non-ideal transmitter characteristics for modulated packet data units belonging to different flows or subflows which flows are treated in parallel such that one modulated packet data unit per flow or subflow is ready to be selected for transmission substantially simultaneously, and, at each transmit instance comparing the sensitivity value for each modulated packet data unit ready to be selected for transmission substantially simultaneously, and selecting for transmission the modulated packet data unit with the lowest sensitivity value.

According to a first aspect of the invention, a method is provided in a communication system for transmitting packet data units from a transmitter to at least one receiver, wherein the packet data units are scrambled and modulated into modulated packet data units, and wherein each modulated packet data unit has a sensitivity to non-ideal characteristics of the transmitter. The packet data units belong to any of at least two data flows or subflows, wherein the packet data units are arranged consecutively, such that one modulated packet data unit per flow or subflow is ready to be selected for transmission substantially simultaneously. The method comprises the steps of, at each transmit occasion:

determining a sensitivity value of the sensitivity to non-ideal characteristics of the transmitter for each of the modulated packet data units per flow or subflow ready to be selected for transmission substantially simultaneously;

comparing the sensitivity value for each of the modulated packet data units per flow or subflow ready to be selected for transmission substantially simultaneously;

selecting for transmission, the modulated packet data unit with the lowest sensitivity value, and transmitting the selected modulated packet data unit.

According to a second aspect of the invention, a transmitter apparatus is provided in a communication system for transmitting packet data units to at least one receiver, wherein the transmitter apparatus comprises a transmitter having at least two scrambling units and at least two modulation units arranged for scrambling and modulating packet data units into modulated packet data units, and wherein each modulated packet data unit has a sensitivity to non-ideal characteristics of the transmitter. The packet data units belong to any of at least two data flows or subflows, wherein the packet data units of each flow are arranged consecutively, such that one modulated packet data unit is ready to be selected for transmission substantially simultaneously. The transmitter apparatus further comprises a scheduler arranged for:

determining a value of the sensitivity to non-ideal characteristics of the transmitter for each of the one modulated packet data units per flow or subflow ready to be selected for transmission substantially simultaneously;

comparing the sensitivity value for each of the modulated packet data units per flow or subflow ready to be selected for transmission substantially simultaneously;

selecting for transmission the modulated packet data unit with the lowest sensitivity value; and instructing the transmitter to transmit the selected modulated packet data unit.

According to a preferred embodiment of the invention, the value of the sensitivity to non-ideal characteristics of the transmitter for a modulated packet data unit is a peak to average ratio value for the waveform that represents a modulated packet data unit modulated according to OFDM.

According to another embodiment of the invention, the modulated packet data units that, in the selection step, are not selected for transmission are re-scrambled and re-modulated before they are transmitted.

An advantage of the invention is that an average value of the sensitivity to non-ideal transmitter characteristics for transmitted modulated packet data units is reduced, which will result in an increase of the total transmission performance.

Another advantage of the invention is that the number of errors in the transmitted packet data units will decrease, since the packet data units with high sensitivity to non-ideal transmitter characteristics will be reprocessed before they are transmitted.

Yet another advantage is that the solution according to the invention can be incorporated without any significant extra complexity, especially if an opportunistic scheduling mechanism, using other parameters for scheduling such as transmission channel quality, is already performed in the transmitter apparatus.

A further advantage of the invention is that this solution to the high-sensitivity value problem, e.g. the PAR problem, of modulated packet data units is power efficient.

DETAILED DESCRIPTION

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

Figure 1:
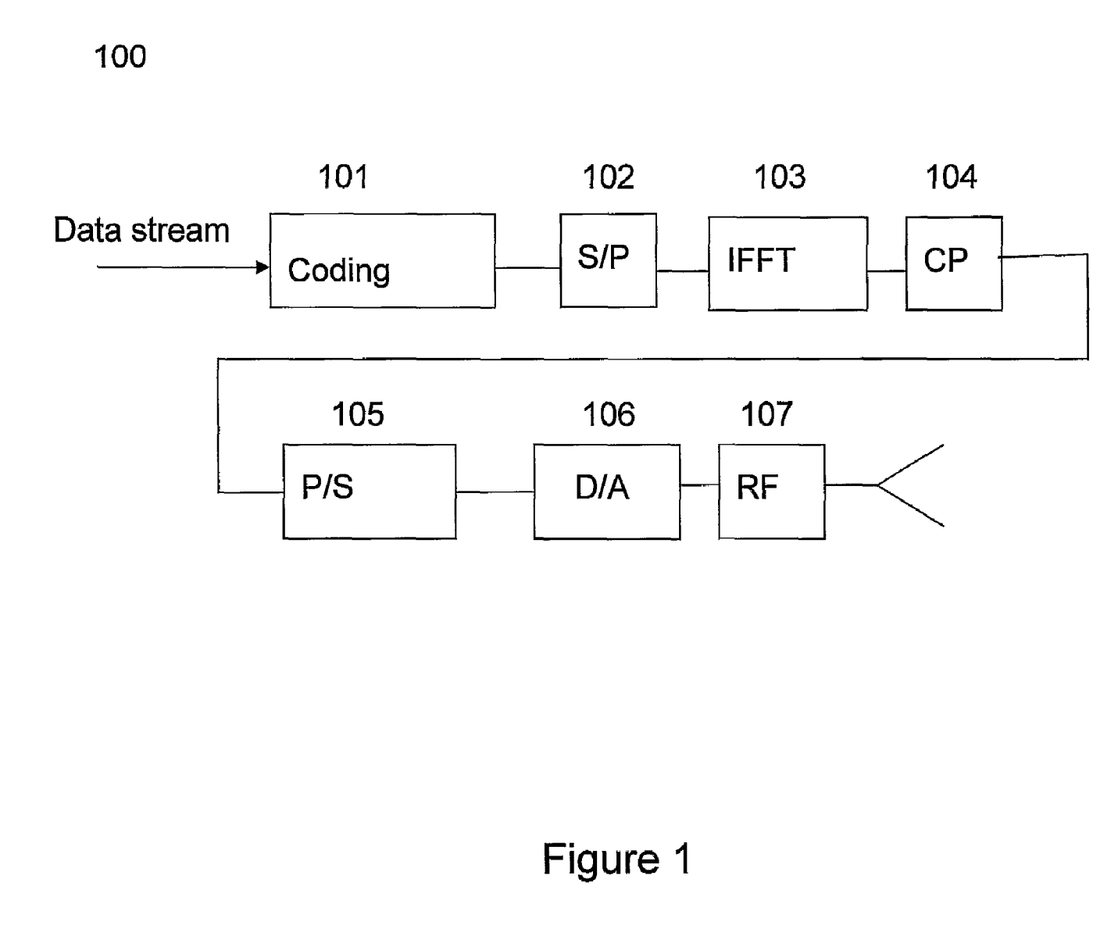
FIG. 1 shows a schematic block diagram of a prior art transmitter used in a node in an OFDM based communication system.

FIG. 1 shows a schematic block diagram of a prior art transmitter in a node in an OFDM based communication system. The figure shows functional blocks involved for modulation and transmission according to an OFDM modulation scheme. An incoming data flow comprising packet data units (PDUs) that enters the transmitter 100 is first coded at a coding block 101, which receives the data flow and partitions the data flow into successive groups of bits representing N complex signal samples, by interleaving and Quadrature Amplitude Modulation (QAM) mapping. According to OFDM, a carrier frequency used by a transmitter is divided into N number of subcarrier frequencies. Other coding such as Forward Error Correction coding (FEC) may also be introduced at the coding block 101. The serial bit stream of each of the group of bits is converted to parallel form at a serial-to-parallel converter (S/P) 102. Thereafter, an Inverse Fast Fourier Transform (IFFT) is performed on each of the group of bits at IFFT block 103. The serial to parallel conversion de-multiplexes each group of bits and the IFFT operation is essentially equivalent to multiplexing and modulating each group of bits where respective data from each group of bits is modulated onto each of the N subcarriers such that a modulated packet data unit (PDU), which in OFDM is called an OFDM symbol, is created. Thereafter, a cyclic prefix (CP) is added to each OFDM symbol at the CP block 104. The cyclic prefix is a copy of the last part of the OFDM symbol, which last part is prepended to the OFDM symbol. The adding of the cyclic prefix makes the transmitted signal periodic, which plays a decisive role in avoiding intersymbol and intercarrier interference. Parallel-to-serial conversion next takes place at a parallel-to-serial converter (P/S) 105. The step of adding the cyclic prefix may also take part after the P/S conversion. Then, a digital-to-analog converter (D/A) 106 converts the digital signal to an analog signal, and the analog signal is amplified and transmitted by an RF transmission block 107.

In such a system, as described above, problems may occur due to the OFDM symbols being sensitive to non-ideal characteristics of the transmitter. I.e. the waveform representing the OFDM symbol may have such a shape that it is more or less easily distorted due to non-ideal transmitter characteristics. One such reason for OFDM symbols being sensitive to non-ideal transmitter characteristics is that the waveform of the signal power of an OFDM symbol has large Peak-to-Average-Ratios (PAR). If the OFDM symbol has a high PAR value, the waveforms at the signal peaks will be distorted if for example the amplifier of the transmitter does not have linear amplification characteristics, or close to linear amplification characteristics. On the other hand, if the OFDM symbol has a low PAR value, the transmitter amplifier needs to have linear characteristics over a smaller working range for amplifying the signal forming an OFDM symbol correctly, compared to if the OFDM symbol has a high PAR value. I.e. the OFDM symbol is less sensitive to non-ideal characteristics of the transmitter if it has a low PAR value compared to if it has a high PAR value. Consequently, the PAR value is a value of the sensitivity of the OFDM symbol to non-ideal characteristics of the transmitter.

A transmitter apparatus, for example in a base station in a cellular communication system, may be adapted to transmit different data flows from one transmitter simultaneously, wherein the data flows are to be sent to different receivers, e.g. mobile stations. In this case, an opportunistic scheduling mechanism may be used for scheduling packet data units belonging to the different data flows, to decide which data flow's next packet data unit that is to be transmitted. The purpose is to make better use of the multiuser diversity gain. Opportunistic scheduling mechanisms are shown e.g. in U.S. Pat. No. 6,449,490, U.S. Pat. No. 6,400,699 and in "Opportunistic transmission scheduling for multiuser MIMO systems", by Dong et al, in Proc. IEEE ICASSP, April 2003, vol. 5, pp. 65-68. The scheduling mechanisms according to prior art are arranged to consider e.g. the instantaneous transmission channel quality towards the different mobile stations. Based on information of the channel quality, the base station schedules at each transmit instance to transmit a packet data unit directed to the mobile station whose instantaneous channel capacity is the largest. The scheduling mechanism may also consider e.g. the type of data to be sent to the different mobile stations and/or the amount of data to be sent to the different mobile stations.

The solution according to the invention remedies distortion problems for transmitting at least two modulated packet data units belonging to at least two different data flows or subflows that are ready to be selected for transmission substantially simultaneously by using an opportunistic scheduling mechanism that analyses a value of the sensitivity to non-ideal transmitter characteristics of the at least two modulated packet data units of the different data flows and opportunistically selects to transmit the modulated packet data unit with the lowest sensitivity value. The sensitivity value is a measure of how easily the modulated packet data unit, or the waveform representing the modulated packet data unit, is distorted due to non-ideal transmitter characteristics, such as non-linear amplification characteristics. The sensitivity value may for example be the PAR value of an OFDM symbol.

This mechanism for opportunistic scheduling is very different to the scheduling mechanisms of the prior art, since the parameter that is considered in the scheduling mechanism of the invention, i.e. the PDU sensitivity value is dependent on the quality of each PDU, and more specifically dependent on the quality of the waveform of each PDU. In comparison, the opportunistic scheduling mechanisms in prior art use different scheduling parameters dependent on the quality of the transmission link or the information in the whole message to be transmitted.

Figure 2:
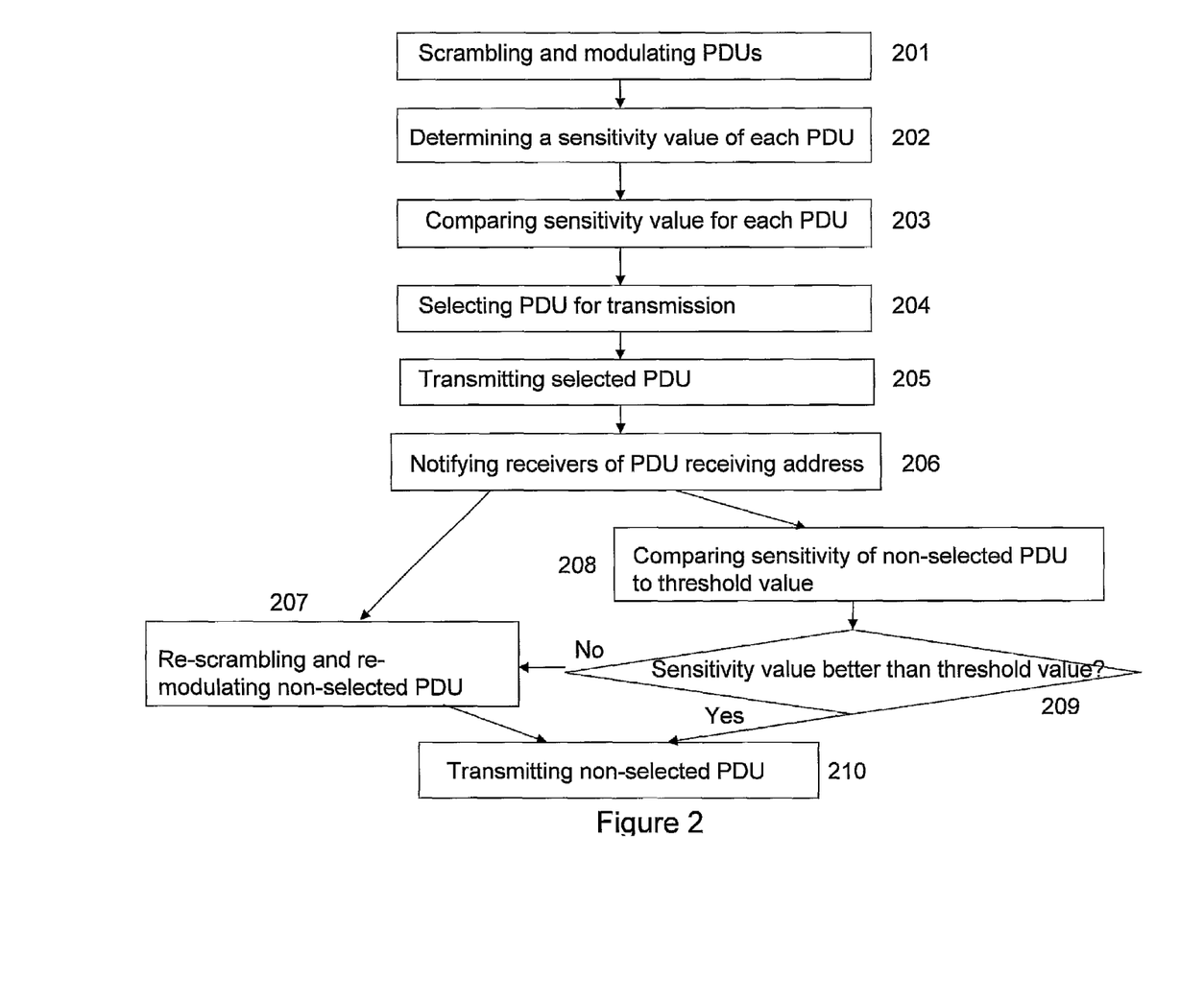
FIG. 2 shows a flowchart of an embodiment of the method of the invention.

FIG. 2 shows a flow chart according to a method of an embodiment of the invention. In the embodiment, at least two separate data flows each comprising consecutive packet data units are to be transmitted from the transmitter. The separate data flows are scrambled and modulated 201 in parallel such that one packet data unit per flow is scrambled and modulated into a modulated packet data unit substantially simultaneously. As a result, one modulated packet data unit per flow will be ready to be selected for transmission substantially simultaneously. Thereafter, the sensitivity value for each of the one modulated packet data unit per flow is determined 202 based on measurements made on the modulated packet data units. At following step 203, the sensitivity value for each of the one modulated packet data unit per flow is compared. Then, the modulated PDU with the lowest sensitivity value in the comparison step, will be selected 204 for transmission. Subsequently, the selected modulated PDU is transmitted 205. Thereby, an opportunistic scheduling mechanism based on the sensitivity value to non-ideal transmitter characteristics for each modulated PDU has been used for deciding which modulated PDU to transmit at each transmit occasion. Also, each receiver is notified 206 which modulated PDU that was transmitted and to which address, i.e. which receiver, it was intended, see below for more details.

A modulated packet data unit that was not selected for transmission because it had a higher sensitivity value than the selected modulated PDU remain in the transmitter for further processing before it is eventually transmitted. According to a first embodiment of the invention such a not selected modulated PDU may be processed such that its sensitivity value is compared 208 to a threshold value that can be set in the scheduling mechanism. If the sensitivity value is better than the threshold value 209, the non-selected modulated PDU is transmitted 210 subsequent to the selected PDU, i.e. the modulated PDU with the lowest sensitivity value. If the sensitivity value of the non-selected modulated PDU is worse than the threshold value, the non-selected PDU is re-scrambled and re-modulated 207 before it is transmitted 210. According to a second embodiment, no threshold value is used and all non-selected modulated PDU(s), i.e. all modulated PDUs with a higher sensitivity value than the first selected PDU will be re-scrambled and re-modulated 207 before they are transmitted 210. The re-scrambling and re-modulation of an already modulated PDU will result in a different and probably better sensitivity value, e.g. a lower PAR value. The procedure described in the flow chart is of course retaken for all subsequent packet data units in the parallel data flows.

In the scrambling step, different sequences for scrambling a PDU may be used. The scrambling sequence used for a certain PDU has to be reported to the receiver. This is especially important for a modulated PDU that was not selected for transmission in the selection step, if this PDU may or may not have been re-scrambled before it was sent. As an alternative to reporting the scrambling sequence used, the receiver may test a number of different scrambling sequences that may have been used, so called blind identification of scrambling sequence, and do a Cyclic Redundancy Check on the result to see which scrambling sequence that was used for the PDU.

As mentioned above, each receiver is notified which modulated PDU that was transmitted. This can be accomplished in at least two alternative ways. According to a first alternative, each PDU may contain an identifier that is used by each receiver to determine whether the PDU was destined for the certain receiver or for another receiver. Potentially, each PDU may also contain a flow identification, identifying which flow the PDU belongs to (in case of more than one data flow to a receiver). In a multihop network this may be represented by a destination node and a PDU identifier. A second alternative would be to use out of band signalling, i.e. to send PDU identification on a channel separate from the channel used for sending the modulated PDUs. Also, out of band signalling may be used such that a range of modulated PDUs are first sent, and in retrospect it is indicated which PDUs that were sent and to which flow each PDU belongs.

The transmitting apparatus according to the invention may reside in any node in a wireline or wireless communication network, such as in a base station in a cellular system for downlink transmission to several mobile stations, or in a node operating in a multihop network. The transmitting apparatus according to the invention may also reside in a mobile station for transmitting uplink, e.g. for scheduling subsequent packets in one data flow but also for scheduling packets belonging to different simultaneous flows from the same mobile station.

Figure 3:
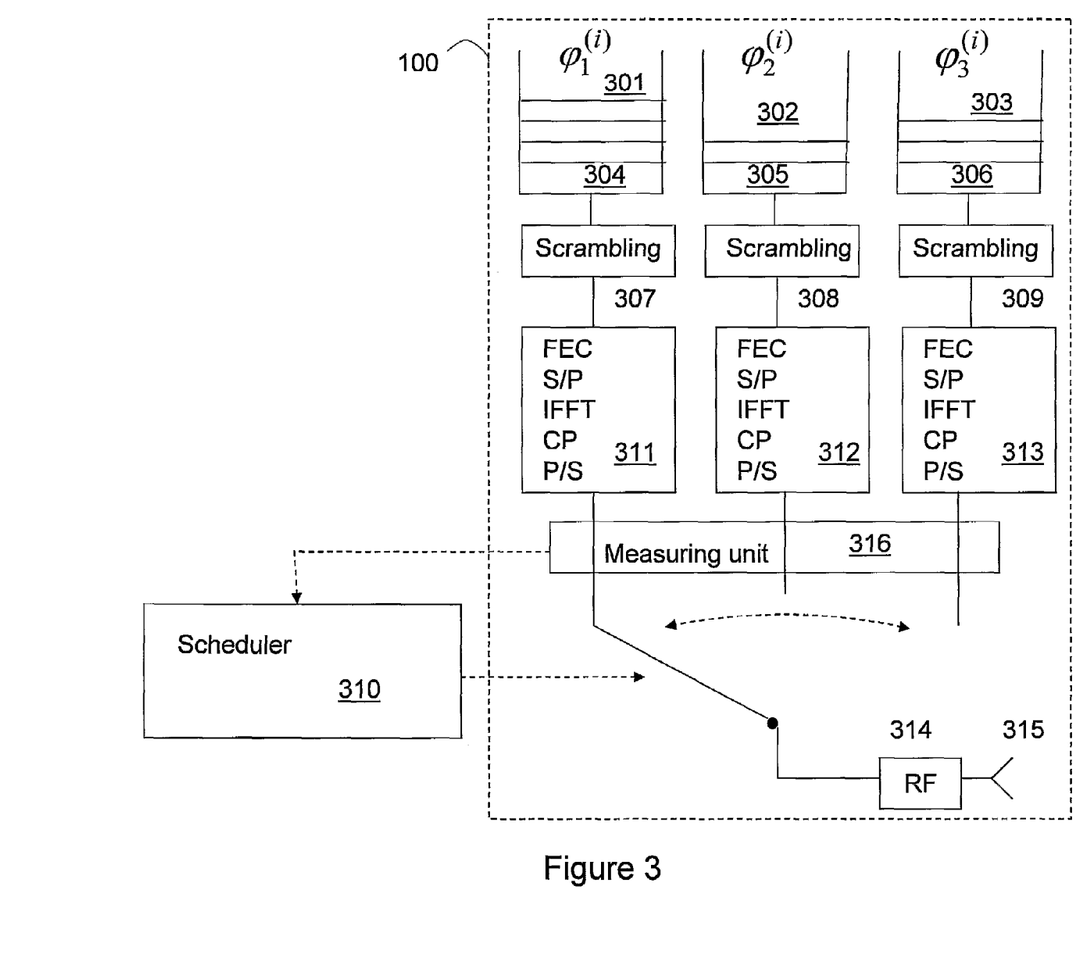
FIG. 3 illustrates a schematic block diagram of an embodiment of the invention.

An exemplary embodiment of the proposed invention is depicted in FIG. 3, where an OFDM based mobile communication system is assumed. FIG. 3 illustrates a transmitting apparatus in a transmitting station, such as a base station transmitting to several mobile stations, having a transmitter 100 and a scheduler 310. The transmitting station has multiple data flows $\phi_1$, $\phi_2$, $\phi_3$, illustrated as queues 301, 302, 303, each flow or queue comprising consecutive packet data units. The flows may be designated for one receiver, or potentially up to three receivers, e.g. three different mobile stations in case of the transmitting station being a base station transmitting the data flows downlink. The transmitter is shown as having one block for scrambling for each data flow, and one common block for the OFDM modulation process, i.e. FEC, S/P, IFFT, CP and P/S for each data flow. Although, the OFDM modulation blocks may in reality be divided into sub-blocks.

The data flows $\phi_1$, $\phi_2$, $\phi_3$, are treated in parallel in the scrambling blocks 307, 308, 309 and in the modulation blocks 311, 312, 313 such that one packet data unit (PDU) 304, 305, 306 of per queue 301, 302, 303 is outputted from each queue substantially simultaneously and scrambled and OFDM modulated in respective scrambling blocks 307, 308, 309 and modulation blocks 311, 312, 313 substantially simultaneously such that one packet data unit per flow or subflow is ready to be selected for transmission substantially simultaneously. Each packet data unit (PDU) 304, 305, 306 is scrambled with a sequence depending on transmit instance, e.g. with a frame number or a time index as seed for the scrambling. In the modulation blocks 311, 312, 313, each scrambled PDU is Forward Error Correction (FEC) encoded, serial to parallel converted (S/P), Modulated and Inverse Fast Fourier Transformed (IFFT), a Cyclic Prefix (CP) is appended and the PDU is parallel to serial converted (P/S). Then, according to the embodiment of the invention, when the OFDM modulated PDUs, the so called OFDM symbols, are ready for transmission, a measuring unit 316 analyses the waveform representing the OFDM symbol of each of the data flows $\phi_1$, $\phi_2$, $\phi_3$ and determines the Peak to Average Ratio (PAR) value for the waveform representing the OFDM symbol of each of the data flows $\phi_1$, $\phi_2$, $\phi_3$. The measuring unit may be a separate unit in the transmitter apparatus or it may be a part of the scheduler. Also, the measuring unit may only analyse the waveform and the determination may take place in the scheduler. The measuring unit may also be divided into three separate measuring units, one for each data flow. The PAR values for each of the OFDM symbols are compared by the scheduler 310, in a comparing means. Thereafter, at each transmit instance, the scheduler, in a selection means, opportunistically selects for transmission the OFDM symbol with the lowest PAR value. The scheduler 310 also has an instruction means for instructing the transmitter to transmit the OFDM symbol with the lowest PAR value, whereby this OFDM symbol is delivered to the Radio Frequency (RF) step 314 of the transmitter for further transmission by the antenna 315 over an air interface to a receiver. Optionally, the appending of the cyclic prefix may take place after the scheduler has selected which OFDM symbol to transmit. In this case, the scheduler has to correct for the missing cyclic prefix when comparing the PAR values of the OFDM symbols.

The scheduler 310 may also have abilities for deciding how to treat an OFDM symbol that was not selected by the transmitter, i.e. an OFDM symbol that had a higher PAR value than the first OFDM symbol. According to an embodiment of the invention, the PAR value of this not selected OFDM symbol may be compared in the comparing means to a threshold value set in the scheduler 310, and, if the PAR value is better than the threshold value, the scheduler will instruct the transmitter to transmit the OFDM symbol subsequent to the transmission of the OFDM symbol that was selected for transmission in the first place. If the PAR value is worse than the threshold value, the scheduler will instruct the transmitter to re-scramble and re-modulate the OFDM symbol before transmission. According to another embodiment of the invention, the scheduler will instruct the transmitter to re-scramble and re-transmit all OFDM symbols that where not selected for transmission in the first place.

Also, the up to three receivers in the system that may receive the transmitted OFDM symbols are notified which OFDM symbol that was transmitted. The notification takes place by either appending an identifier to the OFDM symbol or by using out-of-band signalling such that a separate channel is used for the identification. In this case, a separate message may be sent in retrospect indicating OFDM symbol identification for a number of already transmitted OFDM symbols. In this case, a means is situated either in the scheduler or in the transmitter, for storing an OFDM symbol identification together with a flow identification, such as a destination address, and for instructing the transmitter to transmit a broadcast message including OFDM symbol identifications combined with flow identifications.

Figure 4:
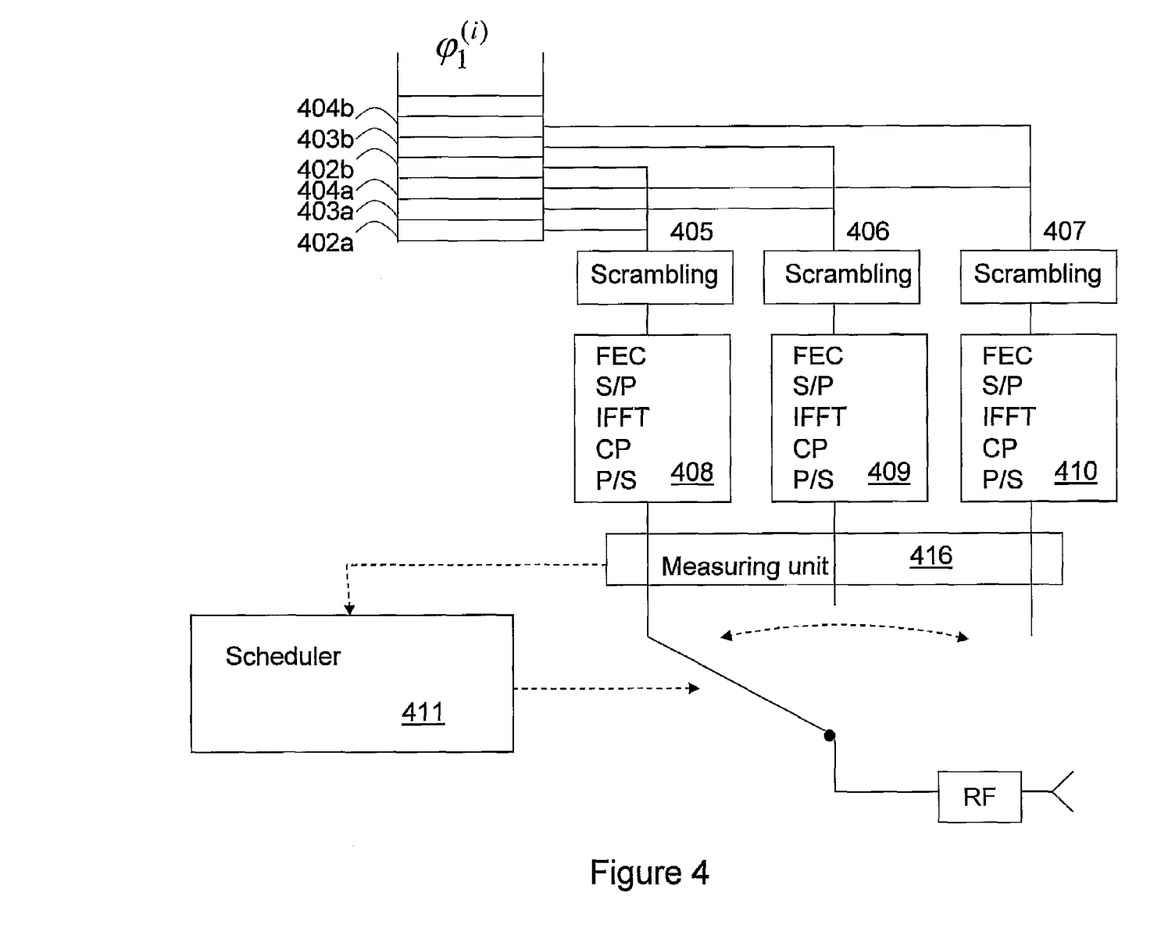
FIG. 4 shows a schematic block diagram of another embodiment of the invention.

Another exemplary embodiment of the invention is shown in FIG. 4 for the scenario where only one flow $\phi_1$ exists. In this case, the method of the invention could be advantageous if the single flow $\phi_1$ is split up into subflows 402, 403, 404, wherein subflow 402 comprises packet data units 402a, 402b etc., subflow 403 comprises packet data units 403a, 403b etc. and subflow 404 comprises packet data units 404a, 404b etc. In the example the single flow is split up into three subflows. Although, the flow may be split up into more or fewer subflows. In this exemplary embodiment, the same operations as describe for the embodiment of FIG. 2 are performed. Although, in this case the consecutive PDUs 402a, 403a, 404a in flow $\phi_1$ will be scrambled and OFDM-modulated simultaneously in the respective scrambling units 405, 406, 407 and in the OFDM units 408, 409, 410 such that in the same transmit instance the selection in the scheduler 411 will be taken between the modulated consecutive PDUs 402a, 403a, 404a of the same flow $\phi_1$. In this case, it is especially important to reorder the PDUs at the receiver. The more subflows that a single flow is split up into the more modulated PDUs will be at hand for the scheduler to select from at each transmit instance. Thereby, as will be shown in FIG. 5, the average PAR value will be lower the more subflows that is used, if the embodiment of re-scrambling and re-modulating the not selected PDUs is used, and, as a consequence, the transmission performance will improve.

The extra complexity due to the multiple IFFTs and scrambling units that will be needed when splitting up flows into subflows and treating the subflows in parallel can be motivated by the performance improvements. Because the chip complexity is not dominated by the signal processing part, including the IFFTs and the scrambling units, but rather by the MAC implementation, the extra chip complexity due to the multiple IFFTs and scrambling units will only marginally increase the total chip complexity.

According to another embodiment of the invention, the transmitting apparatus may use a combination of the embodiment shown in FIG. 3 and the embodiment shown in FIG. 4. I.e. a transmitting apparatus may have multiple data flows wherein each data flow may be divided into different subflows for subsequent processing in the transmitter apparatus according to the invention.

The adding of the cyclic prefix (CP) according to the embodiments of FIGS. 3 and 4 can, in an alternative embodiment, be added after the scheduling instead of before the scheduling. However, the adding of the CP may influence the average power a little, thus influencing the PAR value a little.

In an alternative embodiment of the invention, sensitivity value scheduling according to the invention, such as PAR value scheduling, may be used together with classical transmission channel quality and Quality of Service based opportunistic scheduling. In particular, the sensitivity value may be used together with transmission channel quality aspects, such as radio propagation aspects, for scheduling purposes. In this case, the transmission channel quality is measured in the transmitter apparatus or by a measuring unit external to the transmitter apparatus that transmits the measured transmission channel quality to the transmitter apparatus. The classical method for measuring a link's transmission channel quality is to send and receive pilot signals (pilots). Since the pilots are a priori known, the receiver can determine various aspects of the channel, and potentially including a measure of experienced interference, indicative of the channel quality. According to one example, the sensitivity value scheduling is only used when the transmission channel quality is bad, such that a high transmit power is required. This may be useful because if a lower transmit power can be used, the sensitivity problem is reduced in importance.

According to another example, the transmission channel quality is used in the scheduling mechanism according to the invention when deciding how to treat non-selected modulated PDUs. In this case, the transmission channel quality for the transmission channel of each PDU is measured at a first point of time, when the sensitivity values are determined and compared (step 202 and 203 in FIG. 2), and the transmission channel quality is also measured at a second point of time, when deciding how to treat the non-selected PDUs. If, for example, it is determined that the channel quality at the second point of time has risen above a channel quality threshold, set for example in the scheduler, the non-selected PDU will be transmitted. If not, the non-selected PDU may be re-scrambled and re-modulated before it is transmitted. This is advantageous because if the channel quality rises, the total power of the transmitted signal of the PDU can be lowered, meaning that the amplifier does not have to amplify the signal of the PDU as much, thus making the signal less distorted, i.e. less sensitive to non-ideal characteristics of the power amplifier.

If the scheduling mechanism according to the invention is used together with Quality of Service based opportunistic scheduling, Quality of Service parameters such as PDU residual time to live, priority and fairness parameters could also be considered within the scheduling process of the invention.

Another example of a value of the PDU sensitivity to non-ideal transmitter characteristics is a value dependent on the number of zero-crossings of the signal that makes up the PDU. The more zero-crossings in a signal, the more sensitive will the signal be to non-ideal transmitter characteristics. This is however more directed towards a single carrier system where the zero-crossing, if modulation allows such, result in very sudden phase changes which the power amplifier may have problem to follow.

A value of the PDU sensitivity to non-ideal transmitter characteristics may also be calculated by using the waveform representing the modulated packet data unit and the characteristics of the radio frequency (RF) step of the transmitter. In this case, the characteristics of the RF step, including the non-linearity of the amplifier, is mathematically described by a polynomial. For each modulated PDU, the waveform of the modulated PDU is multiplied with the polynomial describing the RF step. Thereafter the result is Inverse Fast Fourier Transformed into the frequency domain. The result is then analysed, for example compared to a spectrum mask. The spectrum mask may be set by the regulatory limits or in other ways. If any part of the resulted multiplication of the PDU waveform and the RF step polynomial is above the permitted spectrum mask, the PDU will be distorted in the transmission and also risk to violate the regulatory out-of-band radiation. As shown, this result is a value of the sensitivity to non-ideal transmitter characteristics. The spectrum mask can be used as a threshold value for deciding if a modulated PDU can be transmitted or not.

The transmitter apparatus according to the invention is mainly shown above as being implemented in hardware. Although, the invention might as well be implemented in software or in a combination of hardware and software. In this case, corresponding means for performing the steps according to claims 1-15 may be implemented with computer program software in a transmitting apparatus.

Figure 5:
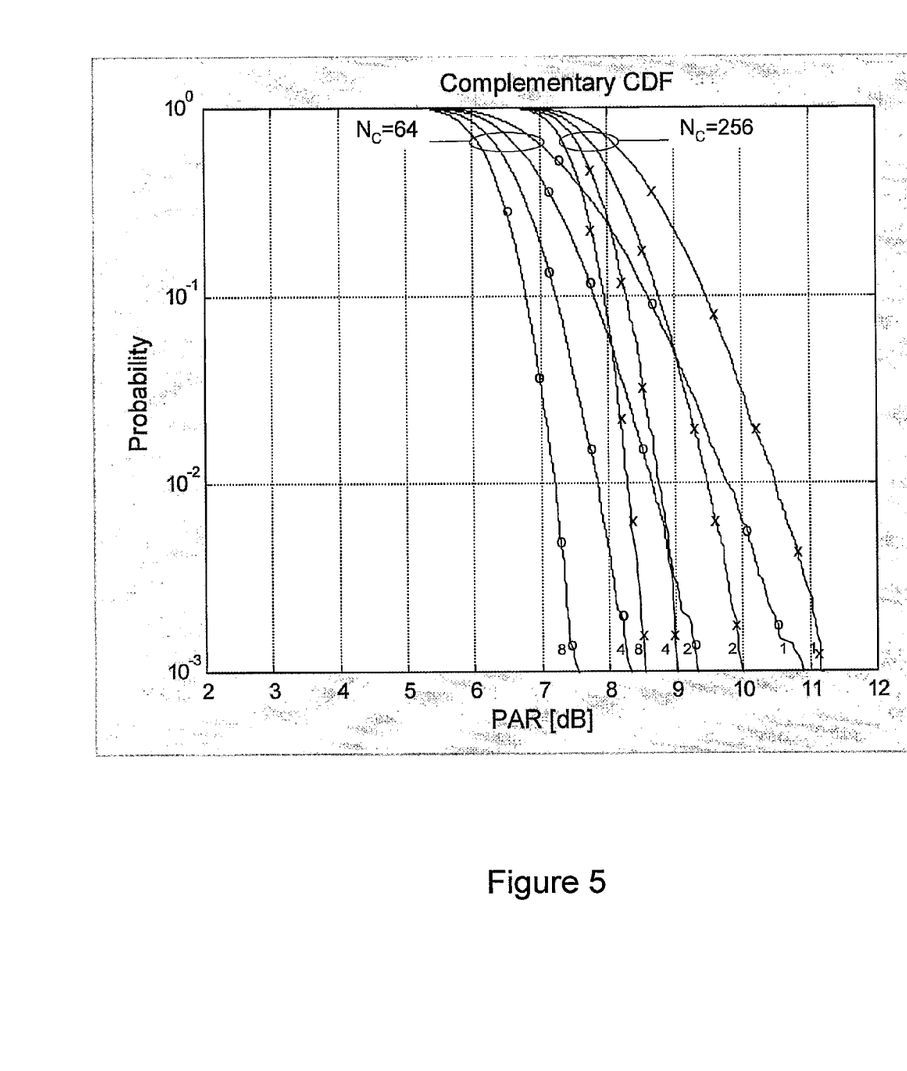
FIG. 5 shows a diagram of the PAR reduction performance for different embodiments of the invention.

The diagram of FIG. 5 shows the complementary Commutative Distribution Function (CDF) for the PAR value achieved with the invention in an OFDM based system employing 64 or 256 subcarriers ($N_C$) when 1, 2, 4 or 8 queues or subflows are used in for example a transmitter having a single data flow, as shown in FIG. 4. In this example, all the non-selected PDUs are re-scrambled in the scrambling unit and re-modulated before being transmitted. The cases where only 1 queue is used is equivalent to a transmitter having only a single flow which is not split up into any subflows if the inventive transmitter is used. This is also equivalent to using no PAR reduction, since there is not more than one modulated packet data unit for the scheduler to choose from at each transmit instance. As seen from the diagram, the more queues or subflows that are used, the higher average PAR reduction is achieved. If 8 queues are used, the diagram shows that an improvement in the order of 2.5-3 dB can be achieved by using the invention both for 64 and for 256 subcarriers at a probability of $10^{-2}$.

As explained above, a benefit of the invention is that an average value of the sensitivity to non-ideal transmitter characteristics for modulated packet data units to be transmitted, such as PAR values, can be reduced, which will result in that the transmission performance will increase. Also, under the assumption that opportunistic scheduling is performed in the transmitter apparatus anyway, the solution according to the invention can be incorporated without any significant extra complexity.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A method of sensitivity-based transmitting of packet data units from a transmitter to one or more receivers comprising:

scrambling and modulating consecutive packet data units belonging to two or more data flows or subflows to obtain corresponding modulated packet data units for transmission;

transmitting a modulated packet data unit from one of the data flows or subflows at each transmit instance; and selecting the modulated packet data unit to be transmitted at each transmit instance based at least in part on comparing respective sensitivity values of the modulated packet data units that are candidates for transmission at each transmit instance, wherein the sensitivity value of each modulated packet data unit indicates its sensitivity to non-ideal transmitter characteristics.

2. The method of claim 1, further comprising retaining the modulated packet data units not selected for transmission for further processing as remaining modulated packet data units.

3. The method of claim 2, wherein the further processing of remaining modulated packet data units comprises comparing the sensitivity value of each remaining modulated packet data unit to a sensitivity value threshold and subsequently transmitting the remaining modulated packet data unit if the sensitivity value is better than the sensitivity value threshold.

4. The method of claim 3, further comprising, if the sensitivity value is not better than the threshold, re-scrambling and re-modulating the packet data unit corresponding to the remaining modulated packet data unit to obtain a new modulated packet unit having a new sensitivity value, and subsequently selecting for transmission the new modulated packet data unit in dependence on the new sensitivity value.

5. The method of claim 1, further comprising including packet identifiers in transmitted modulated packet data units to indicate which ones of the one or more receivers the transmitted modulated packet data units are directed towards.

6. The method of claim 1, further comprising using out-of-band signalling to indicate which ones of the one or more receivers that transmitted modulated packet data units are directed towards.

7. The method of claim 1, further comprising retrospectively indicating which ones of the one or more receivers that transmitted modulated packet data units were directed towards.

8. The method of claim 1, further comprising determining the sensitivity value of each modulated packet data unit in dependence on one or more characteristics of a waveform representing the modulated packet data unit.

9. The method of claim 8, wherein determining the sensitivity value of each modulated packet data unit in dependence on one or more characteristics of a waveform representing the modulated packet data unit comprises determining the sensitivity value based on a peak-to-average ratio of signal power for the waveform.

10. The method of claim 8, further comprising determining the sensitivity value of each modulated packet data unit in dependence on one or more characteristics of an associated radiofrequency transmitter.

11. The method of claim 1, wherein modulating the consecutive packet data units belonging to two or more data flows or subflows comprises modulating each packet data unit via multicarrier modulation based on Orthogonal Frequency Division Multiplexing (OFDM).

12. The method of claim 1, wherein selecting the modulated packet data unit to be transmitted at each transmit instance based at least in part on comparing respective sensitivity values of the modulated packet data units that are candidates for transmission at each transmit instance further comprises comparing respective transmission channel qualities of the modulated packet data units that are candidates for transmission at each transmit instance and selecting the modulated packet data unit to be transmitted at each transmit instance in dependence on both the comparison of respective sensitivity values and the comparison of respective transmission channel qualities.

13. The method of claim 12, wherein a modulated packet data unit that was not selected for transmission is considered a remaining modulated packet data unit, and further comprising re-measuring the transmission channel quality associated with the remaining modulated packet data unit and subsequently transmitting the remaining modulated packet data unit responsive to detecting improvements in the associated transmission channel quality.

14. The method of claim 12, wherein a modulated packet data unit that was not selected for transmission is considered a remaining modulated packet data unit, and further comprising re-measuring the transmission channel quality associated with the remaining modulated packet data unit and subsequently transmitting the remaining modulated packet data unit responsive to detecting that the associated transmission channel quality is better than a transmission channel quality threshold.

15. The method of claim 1, further comprising performing said method of sensitivity-based transmitting of packet data units on a conditional basis, wherein sensitivity-based transmitting of packet data units is used if transmission channel qualities respectively associated with the two or more data flows or subflows are below a transmission channel quality threshold and is not used if the transmission channel qualities respectively associated with the two or more data flows or subflows exceed a transmission channel quality threshold.

16. The method of claim 1, wherein the modulated packet data units comprise Orthogonal Frequency Division Multiplexing (OFDM) symbols.

17. The method of claim 1, further comprising splitting a single data flow of consecutive packet data units into two or more subflows of consecutive packet data units, such that consecutive modulated packet data units formed from the two or more subflows are candidates for transmission at each transmit instance.

18. A method of sensitivity-based transmitting of packet data units from a transmitter to one or more receivers comprising:
   scrambling and modulating consecutive packet data units from two or more data flows or subflows to obtain corresponding modulated packet data units;
   determining a sensitivity value for each modulated packet data unit reflecting its sensitivity to a non-ideal transmitter characteristic;
   comparing at each transmit instance the sensitivity values of modulated packet data units that are candidates for transmission at that transmit instance; and
   selecting for transmission at each transmit instance the modulated packet data unit having the lowest sensitivity value.

19. The method of claim 18, further comprising, for each modulated packet data unit not selected for transmission, if its sensitivity value is not better than a sensitivity value threshold, re-scrambling and modulating the corresponding packet data unit to obtain new modulated packet data units having a new sensitivity value and transmitting the new modulated packet data unit at a subsequent transmit instance in dependence on the new sensitivity value.

20. A transmitter apparatus in a communication system configured to perform sensitivity-based transmitting of packet data units to one or more receivers, said transmitter apparatus comprising:
   scrambling and modulating units configured to scramble and modulate consecutive packet data units belonging to two or more data flows or subflows to obtain corresponding modulated packet data units for transmission; and
   a scheduler configured to:
      instruct an associated transmitter to transmit a modulated packet data unit from one of the data flows or subflows at each transmit instance; and
      select the modulated packet data unit to be transmitted at each transmit instance based at least in part on comparing respective sensitivity values of the modulated packet data units that are candidates for transmission at each transmit instance, wherein the sensitivity value of each modulated packet data unit indicates its sensitivity to non-ideal characteristics of the associated transmitter.

21. The transmitter apparatus of claim 20, wherein the transmitter apparatus is configured to retain the modulated packet data units not selected for transmission for further processing as remaining modulated packet data units.

22. The transmitter apparatus of claim 21, wherein the transmitter apparatus is configured to further process remaining modulated packet data units by comparing the sensitivity value of each remaining modulated packet data unit to a sensitivity value threshold and subsequently instruct the associated transmitter to transmit the remaining modulated packet data unit if the sensitivity value is better than the sensitivity value threshold.

23. The transmitter apparatus of claim 22, wherein the transmitter apparatus is configured to, if the sensitivity value is not better than the threshold, re-scramble and re-modulate the packet data unit corresponding to the remaining modulated packet data unit to obtain a new modulated packet unit having a new sensitivity value, and subsequently select for transmission the new modulated packet data unit in dependence on the new sensitivity value.

24. The transmitter apparatus of claim 20, wherein the transmitter apparatus is configured to include packet identifiers in transmitted modulated packet data units to indicate which ones of the one or more receivers the transmitted modulated packet data units are directed towards.

25. The transmitter apparatus of claim 20, wherein the transmitter apparatus is configured to use out-of-band signalling to indicate which ones of the one or more receivers that transmitted modulated packet data units are directed towards.

26. The transmitter apparatus of claim 20, wherein the transmitter apparatus is configured to retrospectively indicate which ones of the one or more receivers that transmitted modulated packet data units were directed towards.

27. The transmitter apparatus of claim 20, wherein the transmitter apparatus is configured to determine the sensitivity value of each modulated packet data unit in dependence on one or more characteristics of a waveform representing the modulated packet data unit.

28. The transmitter apparatus of claim 27, wherein the transmitter apparatus is configured to determine the sensitivity value of each modulated packet data unit based on a peak-to-average ratio of signal power for the waveform representing the modulated packet data unit.

29. The transmitter apparatus of claim 27, wherein the transmitter apparatus is configured to determine the sensitivity value of each modulated packet data unit further in dependence on one or more characteristics of the associated radiofrequency transmitter.

30. The transmitter apparatus of claim 20, wherein the transmitter apparatus is configured to modulate the consecutive packet data units belonging to two or more data flows or subflows via multicarrier modulation based on Orthogonal Frequency Division Multiplexing (OFDM).

31. The transmitter apparatus of claim 20, wherein the transmitter apparatus is configured to select the modulated packet data unit to be transmitted at each transmit instance additionally based on comparing respective transmission channel qualities associated with the modulated packet data units that are candidates for transmission at each transmit instance.

32. The transmitter apparatus of claim 31, wherein a modulated packet data unit that was not selected for transmission is considered a remaining modulated packet data unit, and wherein the transmitter apparatus is configured to re-measure the transmission channel quality associated with the remaining modulated packet data unit and subsequently instruct the associated transmitter to transmit the remaining modulated packet data unit responsive to detecting improvements in the associated transmission channel quality.

33. The transmitter apparatus of claim 31, wherein a modulated packet data unit that was not selected for transmission is considered a remaining modulated packet data unit, and wherein the transmitter apparatus is configured to re-measure the transmission channel quality associated with the remaining modulated packet data unit and subsequently instruct the associated transmitter to transmit the remaining modulated packet data unit responsive to detecting that the associated transmission channel quality is better than a transmission channel quality threshold.

34. The transmitter apparatus of claim 20, wherein the transmitter apparatus is configured to perform said sensitivity-based transmitting of packet data units on a conditional basis, wherein sensitivity-based transmitting of packet data units is used if transmission channel qualities respectively associated with the two or more data flows or subflows are below a transmission channel quality threshold and is not used if the transmission channel qualities respectively associated with the two or more data flows or subflows exceed a transmission channel quality threshold.

35. The transmitter apparatus of claim 20, wherein the modulated packet data units comprise Orthogonal Frequency Division Multiplexing (OFDM) symbols.

36. The transmitter apparatus of claim 20, wherein the transmitter apparatus is configured to split a single data flow of consecutive packet data units into two or more subflows of consecutive packet data units, such that consecutive modulated packet data units formed from the two or more subflows are candidates for transmission at each transmit instance.

37. A transmitter apparatus in a communication system configured to perform sensitivity-based transmitting of packet data units to one or more receivers, said transmitter apparatus comprising:

scrambling and modulating units configured to obtain corresponding modulated packet data units from consecutive packet data units from two or more data flows or subflows; and
  a scheduler configured to:
    determine a sensitivity value for each modulated packet data unit reflecting its sensitivity to a non-ideal transmitter characteristic;
    compare at each transmit instance the sensitivity values of modulated packet data units that are candidates for transmission at that transmit instance; and
    select for transmission at each transmit instance the modulated packet data unit having the lowest sensitivity value.

38. A computer program product in a memory of a digital computer device residing in a transmitter apparatus, wherein the computer program product comprises program instructions for configuring the transmitter apparatus to:
  scramble and modulate consecutive packet data units from two or more data flows or subflows to obtain corresponding modulated packet data units;
  determine a sensitivity value for each modulated packet data unit reflecting its sensitivity to a non-ideal transmitter characteristic;
  compare at each transmit instance the sensitivity values of modulated packet data units that are candidates for transmission at that transmit instance; and
  select for transmission at each transmit instance the modulated packet data unit having the lowest sensitivity value.

* * * * *

UNITED STATES PATENT AND TRADEMARK OFFICE
CERTIFICATE OF CORRECTION

PATENT NO. : 7,697,409 B2  Page 1 of 1
APPLICATION NO. : 11/722245
DATED : April 13, 2010
INVENTOR(S) : Larsson

It is certified that error appears in the above-identified patent and that said Letters Patent is hereby corrected as shown below:

On the Title Page, in Item (56), under "FOREIGN PATENT DOCUMENTS", in Column 2, Line 1, delete "CA WO 2004/054193 A2 * 6/2004".

In Column 3, Line 16, delete "g" and insert -- minimizing --, therefor.

Signed and Sealed this

Ninth Day of November, 2010

David J. Kappos
*Director of the United States Patent and Trademark Office*